INVENTOR
SAUL Y. LEVY
BY Carl V. Olson
ATTORNEY

INVENTOR
SAUL Y. LEVY
BY Carl V. Olson
ATTORNEY 3,470,540
Patented Sept. 30, 1969

3,470,540

MULTIPROCESSING COMPUTER SYSTEM WITH SPECIAL INSTRUCTION SEQUENCING

Saul Y. Levy, Princeton, N.J., assignor to RCA Corporation, a corporation of Delaware Filed Apr. 24, 1967, Ser. No. 633,069
Int. Cl. G11b *13/00*
U.S. Cl. 340—172.5 5 Claims

ABSTRACT OF THE DISCLOSURE

A multiprocessing digital computer includes a plurality of processors or processing units capable of simultaneously executing different respective instructions of one or more programs. An associative instruction memory contains instructions including an operation field, an operand address or symbol and a result address. An operand memory contains operands and results at addressable locations. Instructions are read out of the associative instruction memory for transfer to the processors in a sequence determined by the availability of the operands specified by the operand addresses in the instructions. This is accomplished by interrogating the operand address field of the associative instruction memory with an operand address or a result address at the same time that the operand address or the result address is supplied to the operand memory to store therein a respective operand or result.

Background of the invention

It is known to employ a plurality of processors or processing units operating simultaneously to execute instructions of one or more programs. In all such arrangements, each program consists of a sequence of instructions arranged in a logical order so that an instruction producing a result precedes an instruction utilizing the result. The program-fixed sequence of instruction execution may prevent the full parallel utilization (multiprocessing) of a plurality of processing units such as arithmetic units, or such as adders, multipliers, shifters, comparators, etc. For example, a processing unit designed for multiplication may have to remain idle waiting for a "multiply" instruction in a fixed instruction sequence containing many "add" instructions. This is true even when the computer is executing time-interlaced portions of a plurality of different programs (multiprogramming).

Known multiprocessing and multiprogramming systems require a very complex and time-consuming software supervisory system to perform housekeeping and time-sharing control functions. Ideally, a processing unit should automatically be kept busy performing its assigned function so long as (1) there is an instruction anywhere in a program sequence which the processing unit is capable of executing, and (2) the operands required in executing the instruction are available, as by having been generated as the result of the execution of a preceding instruction.

Brief summary of the invention

According to an example of the invention, a computer system includes a plurality of processors or processing units capable of simultaneously executing instructions. An associative instruction memory contains instructions each including an operation code field, an operand address or symbol and a result address. An operand memory contains operands and results at addressable locations. When an operand or a result is transferred to the operand memory, the address of the operand or result is used to interrogate the operand address field of the associative instruction memory. If the interrogating address matches the operand address of an instruction, it is known that the operand needed to execute the instruction is available in the operand memory. This instruction and the operand are then transferred to an operation-operand stack, from which they are transferred to an available, appropriate processing unit.

Detailed description

Figure 1:
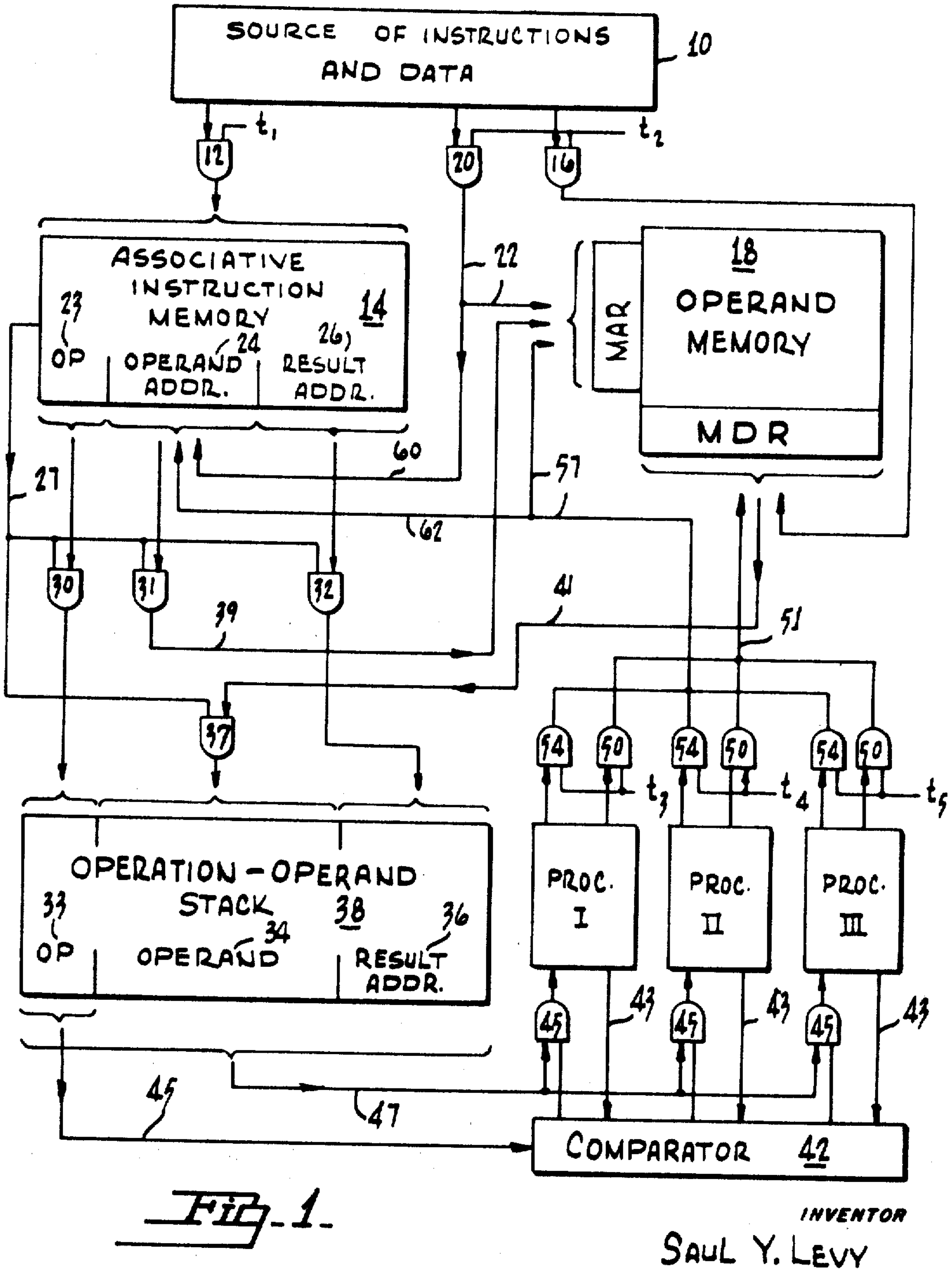
FIG. 1 is a diagram of a multiprocessing computer system constructed according to the teachings of the invention.

Referring now in greater detail to the drawing, there is shown a source 10 of instructions and data which may be any conventional computer apparatus such as a magnetic tape station, a central processor, and a main memory. Instructions are supplied from the source 10 through a gate 12 under the control of a timing pulse $t_1$ to an associative instruction memory 14. Data is supplied from the source 10 through a gate 16 under control of a timing pulse $t_2$ to the memory data register MDR of an operand memory 18. At the same time of pulse $t_2$, a memory address is supplied from the source 10 through a gate 20 and over a line 22 to a memory address register MAR of the operand memory 18. The gates and lines described, and to be described, are conventional multi-bit units and conductors capable of transferring, in parallel, the several or many information bits of an instruction, operand or address. The operand memory 18 may be a conventional random-access memory in which operands are stored at memory locations determined by addresses supplied to the memory address register MAR.

The associative instruction memory 14 may be any conventional associative memory such as that described in Patent No. 3,160,856 entitled "Memory System" and issued to R. R. Seeber et al. on Dec. 8, 1964. Another example is shown in an article entitled "A Magnetic Associative Memory" by J. R. Kiseda et al. which appeared in an IBM Journal of Research and Development, vol. V, April 1961, page 106. Other memory systems which are capable of associative or content addressing can also be used. The associative instruction memory 14 is employed to store instruction words, each of which includes an operation code field 23, an operand address or symbol field 24 and a result address field 26. Each instruction may also include various additional fields or bits for representing modifiers, addresses, indicators, etc.

The associative instruction memory 14 is constructed so that the operand address field portion 24 of the entire memory may be interrogated to determine whether any one or more of the instruction words in the memory contains an operand address field matching the interrogating signal. If a match is found, the entire corresponding instruction word is read out from the memory under control of conventional internal circuitry. A "read-out" signal on line 27 is applied to enable gates 30, 31, 32 and 37.

When an instruction word is read out of the associative instruction memory 14, the operation code field 23 of the instruction word is directed through gate 30 to the operation code field 33 of an operation-operand stack 38. At the same time, the result address field of the instruction word is read from the associative memory 14 through the gate 32 to the result address portion 36 of the operation-operand stack 38. A different course is taken by the operand address field 24 of the read-out instruction. The operand address field 24 is directed through the gate 31 and through line 39 to the memory address register MAR of the operand memory 18. When the operand address is applied to the address register MAR, the addressed operand is read out from the operand memory 18, through its memory data register MDR and through line 41 and gate 37 to the operand portion 34 of the operation-operand stack 38. To summarize, the operation code 23 and the result address 26 of the instruction word in the associative instruction memory 14 are transferred directly to the operation-operand stack 38. But the operand address 24 of the instruction word is used to fetch the operand itself and transfer the operand to the operation-operand stack 38.

The operation-operand stack 38 may be any conventional temporary storage or buffering means capable of storing a plurality of operation-operand words. The operation-operand stack is preferably a circulating stack which accepts words at its top end, transfers words downwardly making them available at its bottom end, and recirculating words from its bottom or output end to its top end if they are not immediately useable by following apparatus. The stack 38 is not described in detail herein because the stack may be constructed in any one of several well-known ways to accomplish the buffering function.

A plurality of processors or processing units are represented in the drawing by three processors designated I, II and III. The plurality of processing units may each perform a different processing function, such as addition, subtraction, multiplication, shifting, etc. On the other hand, two or more of the processing units may be capable of performing the same function, such as, addition. Or, all of the processors may be alike and have the ability to perform all types of arithmetic operations. In any case, the plurality of processing units are constructed to be capable of operating simultaneously, each accomplishing the execution of an appropriate operation-operand word supplied to it from the operation-operand statck 38.

The transfer of operation-operand words from the stack 38 is controlled by a comparator 42. Each processing unit, when it has completed what it was doing, supplies an "available" signal over a respective line 43 to the comparator 42. The operation code field 33 of an operation-operand word available at the output of the stack 38 is applied over line 45 to an input of the comparator 42. The operation code thus supplied to the comparator may indicate that the instruction at the output of the stack 38 requires an adder processing unit for its execution, or a multiplier processing unit, for example. The comparator 42 compares the operation code with the "available" signals from the processors to determine whether an appropriate processing unit is available for executing the operation-operand word. If a processing unit is available, the comparator 42 enables an appropriate one of the gates 45 so that the entire operation-operand word is transferred from stack 38 over line 47 to the appropriate one of the processing units I, II or III.

The processing unit thus supplied with an operation-operand word, including an operation code, an operand and a result address, is capable of proceeding in an autonomous manner with execution of the operation-operand word. When the processing unit completes execution of the operation and has a result available, the result is transferred through a gate 50 and a line 51 to the memory data register MDR of the operand memory 18. At the same time, the result address field 36 of the operation-operand word received by the processing unit from the stack 38 is directed through a gate 54 and over a line 57 to the memory address register MAR of the operand memory 18. The three pairs of gates 50, 54 are each enabled by a respective timing signal $t_3$, $t_4$ and $t_5$. The timing signals occur in a scanning sequence to avoid the confusion that would result if two or more processing units had results available at the same time. Alternatively, instead of using the timing pulse sequence $t_3$, $t_4$ and $t_5$, the traffic control function can be performed by any well-known selection and lock-out arrangement.

By way of review, an operand required for the execution of an instruction is identified in the instruction by the address of the operand in the operand memory 18. Similarly, the computed result to be obtained by executing the instruction is identified in the instruction by the address at which the result is to be stored in the operand memory 18. The addresses of operands and computed results are operand-identifying and result-identifying symbols, respectively. The operand-identifying and result-identifying symbols need not necessarily be memory addresses, but it is convenient to use customarily-employed memory addresses for the additional purpose of identifying and matching available operands with needed operands.

The sequence in which instruction words are read from the associative instruction memory 14 and made available to the processing units will now be described. The time at which an instruction word is read from the associative instruction memory 14 is determined, not solely by the position of the instruction in the sequence of instructions, but rather is determined by the availability of the operand needed in the execution of the instruction. An operand is available if it is stored in the operand memory 18. The availability of an operand is signaled when the operand is first transferred to the operand memory 18 for storage therein.

An operand may be transferred to operand memory 18 as data from the source 10 of instructions and data. When data is transferred to the operand memory 18, the address of the data applied over line 22 to the memory address register MAR is also simultaneously applied over line 60 as an interrogating signal to the operand address portion 24 of the associative instruction memory 14. If the address of the data or operand supplied to the operand memory 18 is the same as the operand address of an instruction word in the associative instruction memory 14, the instruction can be executed. The instruction word is therefore read out from the associative instruction memory 14 to the operation-operand stack 38.

A result produced by a processor in the execution of an instruction may be an operand required by another instruction in the associative instruction memory 14. When a result is transferred over line 51 to the operand memory 18, the address of the result is not only supplied over line 57 to the memory address register MAR of operand memory 18, but is also supplied over line 62 as an interrogating signal to the operand address portion 24 of the associative instruction memory 14. If the address at which the result from the processor is stored in operand memory 18 is the same as the operand address of an instruction in associative instruction memory 14, the instruction can be executed. The instruction is therefore transferred to the operation-operand stack 38.

The order in which an instruction in a program is executed is determined, not strictly by its place in the written sequence of the instruction in the program, but rather by (1) the availability of a necessary operand, and (2) the availability of a processor capable of executing the instruction. The actual sequence in which instructions are executed may be unpredictable and variable in dependence on the availability of operands and processors at the instants when availability tests are made. However, instructions are executed in a sequence which maximizes the utilization of the several processors. The system hardware automatically controls the sequence in which instructions are executed in a manner providing a comparatively faster completion of the program or programs being executed. When the associative instruction memory 14 contains portions of a number of different programs, the processors are kept busy executing instructions which can be executed in all programs without being limited to executing instructions of one program at a time. The simultaneous execution of instructions of different productive programs is accomplished by the hardware without the overhead time loss inherent in the use of supervisory housekeeping software. The invention has been described as applied to a computer system in which each instruction includes two addresses, one being an operand address and the other being a result address. Some computers are designed to employ three-address instructions in which each instruction includes an A operand address, a B operand address and a result address. Reference is now made to FIG. 2 for a description of a modification of the system of FIG. 1 for use in computers employing three-address instructions including two operand addresses.

Figure 2:
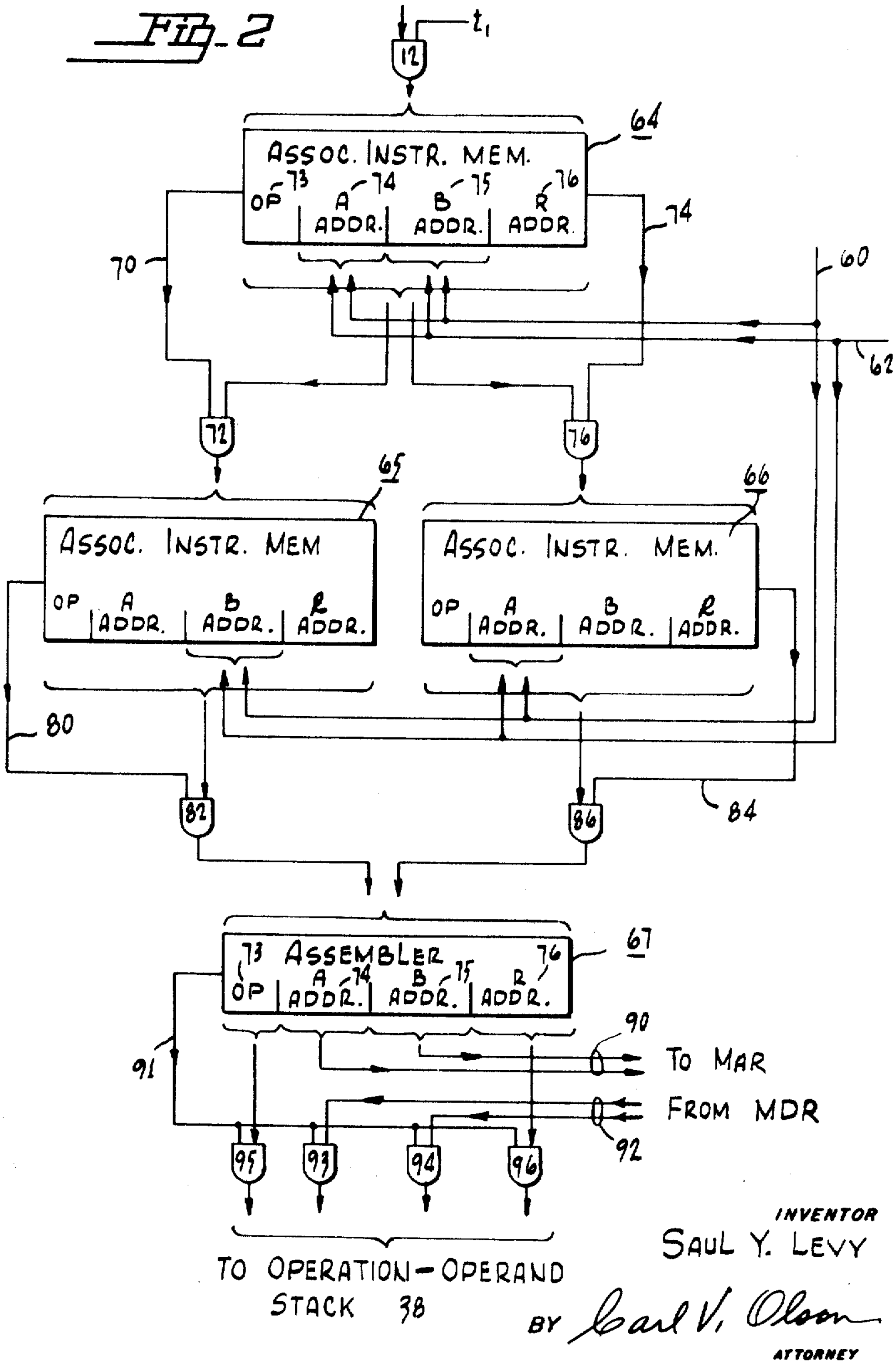
FIG. 2 is a diagram of a modified portion of the system of FIG. 1 for use when instructions include addresses of two operands.

In FIG. 2 there is shown three associative instruction memories 64, 65 and 66, and an assembler 67, which may be substituted for the associative instruction memory 14 in the system of FIG. 1. In FIG. 2, the associative instruction memory 64 is constructed to store instructions each including an operation code portion 73, an A operand address portion 74, a B operand address portion 75 and a result address portion 76. The additional associative instruction memories 65 and 66 are similarly constructed to store instructions each including the listed portions. The operand memory addresses supplied to lines 60 and 62 in the system of FIG. 1 are applied as interrogating signals to both the A address portion 74 and the B address portion 75 of the associative instruction memory 64 in FIG. 2. That is, an address appearing on line 60 is applied simultaneously to portions 74 and 75 of memory 64, and an address appearing at a different time on line 62 is applied simultaneously to the portions 74 and 75 of memory 64.

If the interrogating address applied to memory 64 matches the A address portion 74 of an instruction in the memory, the memory supplies a control signal over line 70 to gate 72 which results in the reading out from the memory 64 of the entire instruction word, and a transfer of the instruction word to the associative instruction memory 65. Similarly, if the interrogating address applied to the B address portion 75 of memory 64 matches a corresponding portion of an instruction stored in the memory, the memory acts through a control signal on line 74 and gate 76 to cause the matching instruction to be transferred to the associative instruction memory 66. As a result of these actions, the instructions remaining in memory 64 are instructions for which neither the A operand nor the B operand are available in the operand memory 18 of FIG. 1. The instructions present in the associative instruction memory 65 are instructions for which the A operand only is available, and the instructions contained in memory 66 are instructions for which the B operand only is available.

At the same time that interrogating addresses on line 60 or 62 are applied to the A and B address portions of memory 64, they are also simultaneously applied as interrogating signals to the B address portion 75 of memory 65 and to the A address portion 74 of memory 66. If an interrogating address applied to the B address portion 75 of memory 65 matches a corresponding portion of an instruction in the memory, the memory 65 acts through a control signal on line 80 and gate 82 to cause a transfer of the corresponding instruction to the assembler 67. Similarly, when an interrogating address applied to the A address portion 74 of memory 66 matches the corresponding address portion of an instruction in the memory, the memory acts through a signal on line 84 and gate 86 to cause the corresponding instruction to be transferred to the assembler 67. An instruction transferred from memory 65 to the assembler 67, or from memory 66 to the assembler 67, is an instruction which has been determined through interrogation to be one for which both of the two required operands are available in the operand memory 18 in the system of FIG. 1.

When an instruction is transferred to the assembler 67, the assembler successively directs the A address portion 74 and the B address portion 75 of the instruction over lines 90 to the memory address register MAR of the operand memory 18 in FIG. 1. This results in the successive retrieval of the corresponding operands stored in the operand memory 18. The accessed operands are transferred from the memory data register MDR of the operand memory 18 successively over lines 92 to gates 93 and 94. At the same time, the assembler acts through a control signal on line 91 to enable gates 93 through 96 to transfer the resulting entire operation-operand word to the operation-operand stack 38 shown in FIG. 1. Thereafter, and in other respects, the operation of a system having three-address instructions is the same as has previously been described in connection with the two-address system illustrated in FIG. 1.

What is claimed is:

1. A multiprocessor computer system comprising
a plurality of processing units,
means for storing operands and computed results,
a content-addressable instruction memory for instruction words each including an operation code, at least one operand-identifying symbol, and a result-identifying symbol,
means for applying interrogating signals to the operand-identifying symbol portion of said instruction memory, and reading out instructions satisfying the interrogating signals,
means to transfer each instruction read out from said instruction memory to an available one of said computing units which is determined from the operation code of the instruction to be capable of execution by the computing unit,
means to transfer computed results from said processing units to said means for storing operands and computed results, and
means operative when a computed result is applied to said means for storing operands and computed results to also apply the result-identifying symbol as an interrogation signal to the operand-identifying symbol portion of said content-addressable instruction memory, whereby the sequence in which instructions are made available to the computing units is automatically determined by the availability of operands required for the execution of the instructions.

2. A multiprocessor computor system comprising
a plurality of processing units,
an operand memory for storing operands and computed results,
means to load operands into said operand memory,
a content-addressable instruction memory for instruction words each including an operation code, at least one operand-identifying symbol, and a result-identifying symbol,
means for applying interrogating signals to the operand-identifying symbol portion of said instruction memory, and reading out instructions satisfying the interrogating signals,
means to transfer each instruction read out from said instruction memory to an available one of said computing units which is determined from the operation code of the instruction to be capable of execution by the computing unit,
means to transfer computed results from said processing units to said operand memory, and
means operative when an operand or computed result is applied to said operand memory to also apply the respective operand-identifying symbol as an interrogation signal to the operand-identifying symbol portion of said content-addressable instruction memory, whereby the sequence in which instructions are made available to the computing units is automatically determined by the availability of operands required for the execution of the instruction.

3. A multiprocessor computer system comprising
a plurality of processing units, a source of instructions and data including operands,
a content-addressable instruction memory for receiving instruction words from said source, said instruction words each including an operation code and at least one operand-identifying symbol,
an operand memory for receiving and storing data including operands from said source,
means operative when an operand-identifying symbol is employed to store a corresponding operand in said operand memory to also apply the operand-identifying symbol as an interrogating signal to the operand-identifying portion of said content-addressable instruction memory, and
stack means for receiving instructions read from said content-addressable instruction memory and making them available to said processing units.

4. A multiprocessor computer system comprising
a plurality of processing units,
an operand memory for storing operands and computed results, said operand memory having an address register and a data register,
means to load operands into said operand memory by applying operand addresses to said address register and operands to said data register,
a content-addressable instruction memory for instruction words each including an operation code, at least one operand address, and a result address,
means for applying interrogating signals to said instruction memory, and reading out instructions having portions satisfying the interrogating signals,
means to transfer each instruction read out from said instruction memory through a buffer to an available one of said computing units which is determined from the operation code of the instruction to be capable of execution by the computing unit,
means to transfer computed results from said processing units to said operand memory by applying the result address to said address register and said computed result to said data register, and
means operative when an operand address or a computed result address is applied to said address register of the operand memory to also apply the respective operand address or computed result address as an interrogation signal to the operand address portion of said content-addressable instruction memory, whereby the sequence in which instructions are made available to the computing units is automatically determined by the availability of operands required for the execution of the instruction.

5. A multiprocessor computer system comprising
a plurality of processing units,
an operand memory for storing operands and computed results, said operand memory having an address register and a data register,
means to load operands into said operand memory by applying operand addresses to said address register and corresponding operands to said data register,
a content-addressable instruction memory for instruction words each including an operation code, at least one operand address, and a result address,
means for applying interrogating signals to said instruction memory, and reading out instructions having portions satisfying the interrogating signals,
an operation-operand stack,
means utilizing the operand address of a read-out instruction to fetch the corresponding operand from said operand memory and to transfer the operand, together with the operation code and result address of the instruction word, to said operation-operand stack,
means to transfer each operation-operand word from said operation operand stack to an available one of said computing units which is determined from the operation code of the operation-operand word to be capable of execution by the computing unit,
means to transfer computed results from said processing units to said operand memory by applying the result address to said address register and said computed result to said data register, and
means operative when an operand or a computed result is stored in said operand memory to concurrently apply the respective operand address or computed result address as an interrogation signal to the operand address portion of said content-addressable instruction memory.

References Cited

UNITED STATES PATENTS

| | | | |
|---|---|---|---|
| 3,229,260 | 1/1966 | Falkoff | 340—172.5 |
| 3,346,851 | 10/1967 | Thornton et al. | 340—172.5 |

PAUL J. HENON, Primary Examiner

R. F. CHAPURAN, Assistant Examiner